United States Patent
Lecoeuche et al.

(10) Patent No.: US 7,814,501 B2
(45) Date of Patent: Oct. 12, 2010

(54) APPLICATION EXECUTION IN A NETWORK BASED ENVIRONMENT

(75) Inventors: Renaud J. Lecoeuche, Bellevue, WA (US); Daniel T. Herron, Sammamish, WA (US); Anand Ramakrishna, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 965 days.

(21) Appl. No.: 11/378,161

(22) Filed: Mar. 17, 2006

(65) Prior Publication Data

US 2007/0220528 A1    Sep. 20, 2007

(51) Int. Cl.
G06F 3/00     (2006.01)
G06F 9/44     (2006.01)
G06F 9/46     (2006.01)
G06F 13/00    (2006.01)

(52) U.S. Cl. .................................. 719/315
(58) Field of Classification Search .......... 719/318, 719/315
See application file for complete search history.

(56) References Cited

U.S. PATENT DOCUMENTS

| | | |
|---|---|---|
| 5,860,059 A | 1/1999 | Aust et al. |
| 6,119,151 A | 9/2000 | Cantrell et al. |
| 6,134,200 A | 10/2000 | Timmermans |
| 6,246,983 B1 | 6/2001 | Zou et al. |
| 6,314,402 B1 | 11/2001 | Monaco et al. |
| 6,510,414 B1 | 1/2003 | Chaves |
| 6,922,411 B1 | 7/2005 | Taylor |
| 7,003,459 B1 | 2/2006 | Gorin et al. |
| 7,424,429 B2 | 9/2008 | Nakagawa et al. |
| 7,729,919 B2 | 6/2010 | Wang |
| 2001/0049599 A1 | 12/2001 | Brotman et al. |
| 2003/0055651 A1 | 3/2003 | Pfeiffer et al. |
| 2003/0149565 A1 | 8/2003 | Chang et al. |
| 2003/0212561 A1 | 11/2003 | Williams et al. |
| 2004/0006474 A1 | 1/2004 | Gong et al. |
| 2004/0019476 A1 | 1/2004 | Glynn |
| 2004/0061717 A1 | 4/2004 | Menon et al. |
| 2004/0086095 A1 | 5/2004 | Dixit et al. |
| 2004/0111729 A1* | 6/2004 | Moore et al. ............... 719/318 |
| 2004/0125794 A1 | 7/2004 | Marquette et al. |
| 2004/0153322 A1 | 8/2004 | Neuberger et al. |

(Continued)

FOREIGN PATENT DOCUMENTS

WO    02091364 A1    11/2002

OTHER PUBLICATIONS

Burnett, Daniel C., "Speech Objects Specification V1.0" [Online] Nov. 14, 2000, XP002298447 Internet Retrieved from the Internet: w3.org/TR/2000/NOTE-speechobjects-20001114, pp. 1-38.

(Continued)

*Primary Examiner*—Li B Zhen
*Assistant Examiner*—Timothy A Mudrick
(74) *Attorney, Agent, or Firm*—Christopher J. Volkmann; Westman, Champlin & Kelly, P.A.

(57) ABSTRACT

Authored code executable on a server in a network based environment invokes APIs (application program interfaces) that are also adapted to be invoked in a non-distributed operating environment such that the authored code receives the same results and/or events as if executed on a server in the non-distributed operating environment.

11 Claims, 4 Drawing Sheets

U.S. PATENT DOCUMENTS

2006/0015335 A1* 1/2006 Vennelakanti et al. ....... 704/235
2006/0136932 A1* 6/2006 Bose et al. ................. 719/314

OTHER PUBLICATIONS

Signer et al., "Aural Interfaces to Databases Based on VoiceXML", Institute for Information Systems, Swiss Federal Institute of Technology, CH-8092 Zurich Switzerland, pp. 1-15. 2002.

Ball et al., "Sisl: Several Interfaces, Single Logic", Microsoft Research, Software Production Research Dept. and Dept. of Mathematical and Computer Sciences, pp. 1-20, Jan. 6, 2000.

Cross et al., "XHTML+Voice Profile 1.1", xml.coverpages.org/IBM-xv11spec.pdf, pp. 1-49, Jan. 28, 2003.

McGlashan et al., "Voice Extensible Markup Language (VoiceXML) Version 2.0", www.w3.org/TR/voicexml21/, pp. 1-235, Jan. 28, 2003.

Cisco Systems Inc., et al. "SALTS Speech Application Language Tags (SALT) 1.0 Specification", pp. 1-112, Jul. 15, 2002.

Raggett, "Getting Started with VoiceXML 2.0", w3.org/Voice/Guide revised Nov. 14, 2001, pp. 1-9.

Eisenzopf, "VoiceXML and the Future of SALT", Business Communications Review, pp. 54-59, May 2002 bcr.com/bcrmag/2002/05p54.asp) 2 pages.

Potter et al., "VoiceXML and SALT—How are they different and why?" Speech Technology Magazine, pp. 1-3, May/Jun. 2002 (speechtechmag.com).

Marsan, "Shakin' On the SALT", Network World, Sep. 23, 2002, pp. 1-3, networkworld.com/buzz/2002/salt.html.

Eisenzopf, "SALT Submission to W3C Could Impact the Future of VoiceXML", pp. 1-3, Oct. 4, 2002, (developer.com/voice/article.php/1567021).

* cited by examiner

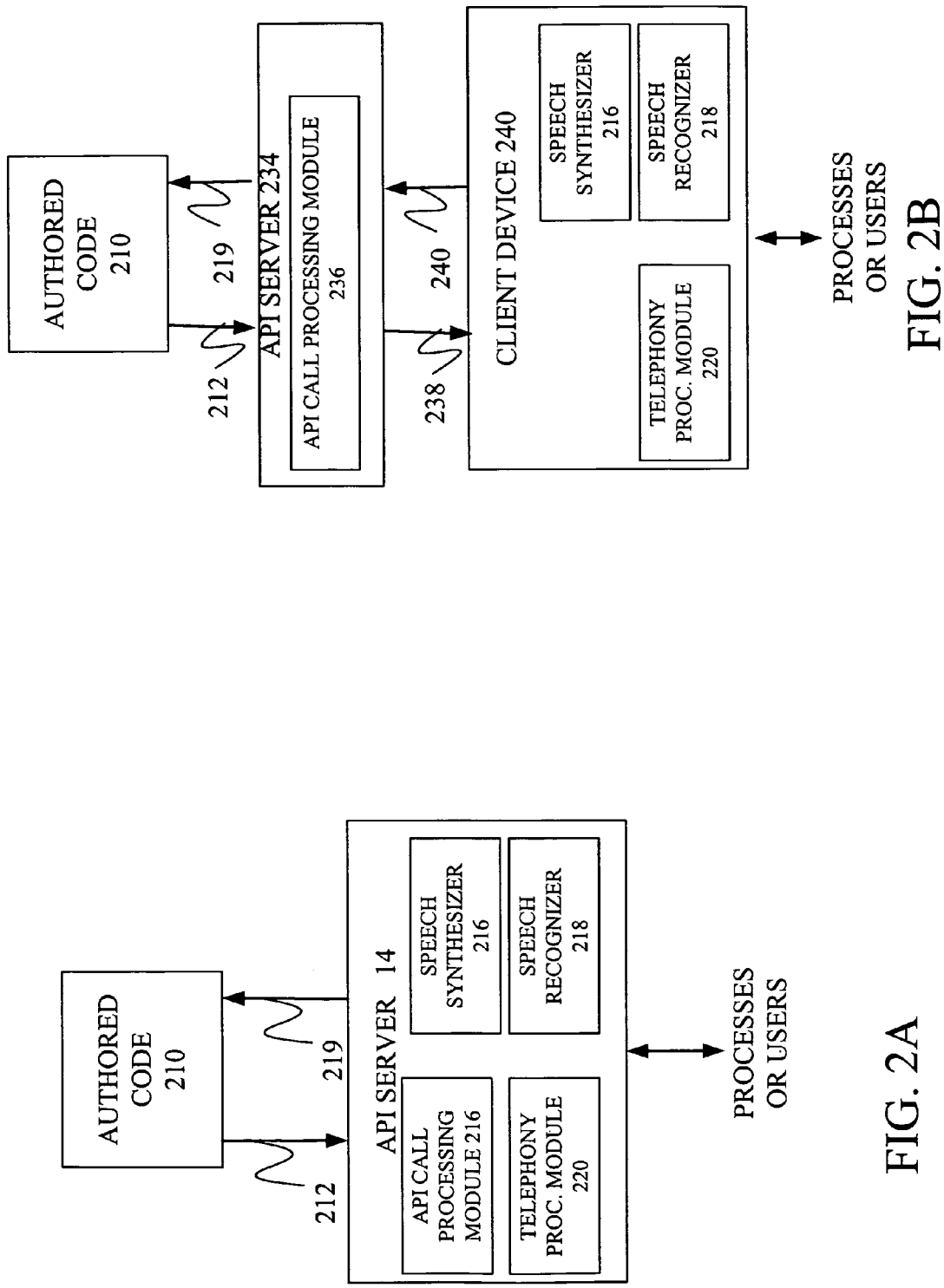

APPLICATION EXECUTION IN A NETWORK BASED ENVIRONMENT

BACKGROUND

The discussion below is merely provided for general background information and is not intended to be used as an aid in determining the scope of the claimed subject matter.

Applications can be often developed in one of two methodologies: as a web or network based environment where development is divided between a server and a client, or as a non-distributed application where development is done on one platform. There are advantages and disadvantages for both methodologies. Referring first to the web or network based environment, development includes authoring the speech application to run on a web server that communicates to a second machine that interacts with the user. For instance, the second machine can be a telephony server that can receive calls from a user using a simple phone. The telephony server works with a speech server (either located on the same machine or on a separate machine). The speech application portion executing on the web server typically renders a mark-up language such as VoiceXML, which is a W3C standard, or SALT (Speech Application Language Tags), which is an ECMA standard. Use of these or other standards encourages portability across platforms. However, one disadvantage is that since another portion of the speech application runs on the client (e.g. telephony server), the author usually must be fluent in a number of languages (e.g. C#, javascript, etc). Since the application is split, debugging is more difficult. Furthermore, network delays can impact performance.

In a non-distributed application, all components or portions of the application can be developed using one language/platform. Debugging is easier since the development process is integrated; however, the code is typically proprietary, which can limit adoption for customers who want to avoid vendor lock-in.

Finally, switching from one mode of development to the other has so far been very costly. A major rewrite of the application is necessary to move from a non-distributed application to a web or network based application, or vice-versa.

SUMMARY

This Summary and Abstract are provided to introduce some concepts in a simplified form that are further described below in the Detailed Description. This Summary and Abstract are not intended to identify key features or essential features of the claimed subject matter, nor is it intended to be used as an aid in determining the scope of the claimed subject matter. In addition, the description herein provided and the claimed subject matter should not be interpreted as being directed to addressing any of the short-comings discussed in the Background.

Authored code executable on a server in a network based environment invokes APIs (application program interfaces) that are also adapted to be invoked in a non-distributed operating environment such that the authored code receives the same results and/or events as if executed on a server in the non-distributed operating environment.

With only one set of APIs, the authored application can execute API calls that get directly executed, or the APIs can be used to render a mark-up language based on a desired standard that is sent to a client for execution. The client interacts with the user and returns results in the desired standard, which are converted and returned to the authored application as if the method had been executed locally on the server. In this manner, the same authored code can be used in either environment; thus, the developer or author need only know how to develop the application by invoking the APIs.

BRIEF DESCRIPTION OF THE DRAWINGS

FIG. 2A is a block diagram of a first operating environment.

FIG. 2B is a block diagram of a second operating environment.

DETAILED DESCRIPTION

One general concept herein described provides a platform that allows an author to develop a speech application for execution in a non-distributed environment or be able to execute the same application in a web or network environment. In the exemplary embodiment, the author is provided with a set of APIs (application program interfaces) in order to develop the speech application by invoking API calls and receiving results. In this manner, the author need only know one language/platform, which provides more efficient and complete debugging support.

However, before describing further aspects, it may be useful to first describe exemplary computing devices or environments that can implement the description provided below.

Figure 1:
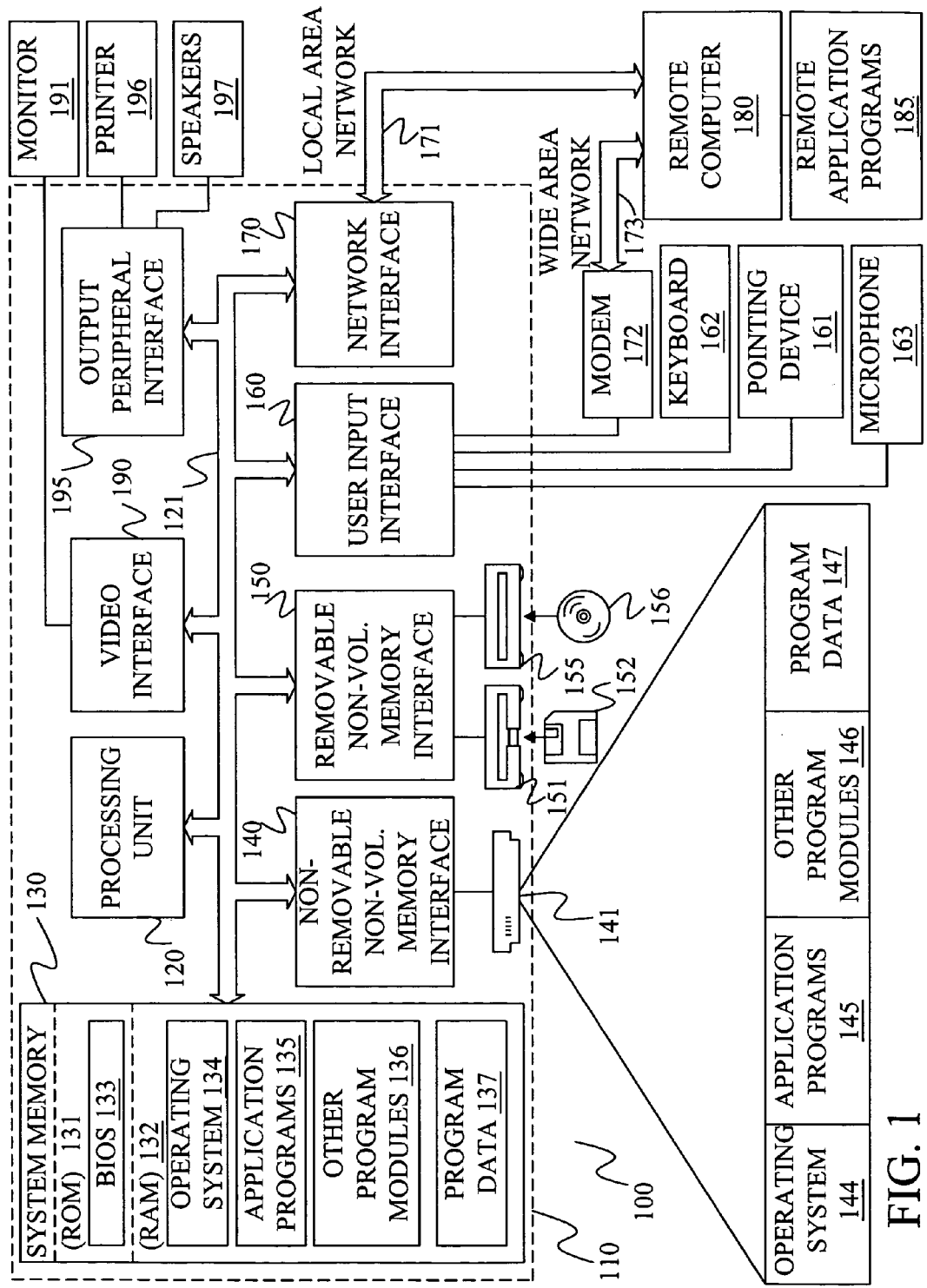
FIG. 1 is a schematic block diagram of an embodiment of a computing environment.

FIG. 1 illustrates an example of a suitable computing system environment 100 on which the concepts herein described may be implemented. The computing system environment 100 is again only one example of a suitable computing environment and is not intended to suggest any limitation as to the scope of use or functionality of the description below. Neither should the computing environment 100 be interpreted as having any dependency or requirement relating to any one or combination of components illustrated in the exemplary operating environment 100.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the concepts herein described can be carried out on a computer system such as that described with respect to FIG. 1. However, other suitable systems include a server, a computer devoted to message handling, or on a distributed system in which different portions of the concepts are carried out on different parts of the distributed computing system.

As indicated above, one concept herein described provides a platform that allows an author to develop an application for execution in a non-distributed environment or be able to execute the same application in a web or network environment. This will be described in the context of a speech application; however, it should be understood that this is but one exemplary embodiment in that the concepts herein described can be implemented generally in any form of recognition application (e.g. handwriting, vision and/or gesture) as well as any other application that communicates between servers and one or more clients wherein the authored code invokes API(s) to execute the application. In particular, the concepts are applicable to mark-up language pages that are generated by servers and rendered by clients, but are based on the same API(s) that are invoked in a non-distributed environment. The modules discussed below are for speech recognition; however, suitable processing modules for implementing any desired application can be provided.

Referring to FIGS. 2A and 2B, two operating environments are illustrated. FIG. 2A illustrates a non-distributed environment for execution of the speech application. Authored code 210 is written to invoke APIs calls 212 that perform the desired speech application. API calls 212 are invoked by an API processing server 214 that interacts with users (clients) or other processes. For purposes of understanding, server 214 includes modules, components or code that includes an API call processing module 216 and other modules for speech processing such as a speech synthesizer 216 for generating audible prompts to the user and a speech recognizer 218 for recognizing audible responses from the user and providing an output suitable for further processing. Results 219 in the form of but not limited to events (prompt initiation, prompt completion, the user interrupting a prompt, recognition completion, timeouts, etc.), recognition results, other forms of input such as through a keyboard or mouse, are provided to the authored code 210 from the API processing server 214.

Depending on the application, for instance, based on the form of user interaction, server 214 can also include other modules. For example, if the server 214 is adapted to receive telephone calls from simple phones, server 214 can include a telephony processing module 220 for receiving the calls that works with the speech synthesizer 216 and the speech recognizer 218 to allow the user to execute the application and receive and provide information. However, the languages and code supporting the functionality of server 214 need not be known to the application author. Rather, the author need only know the language/platform used for invoking the APIs through calls 212 and processing the events and/or results 219.

Figure 3A:
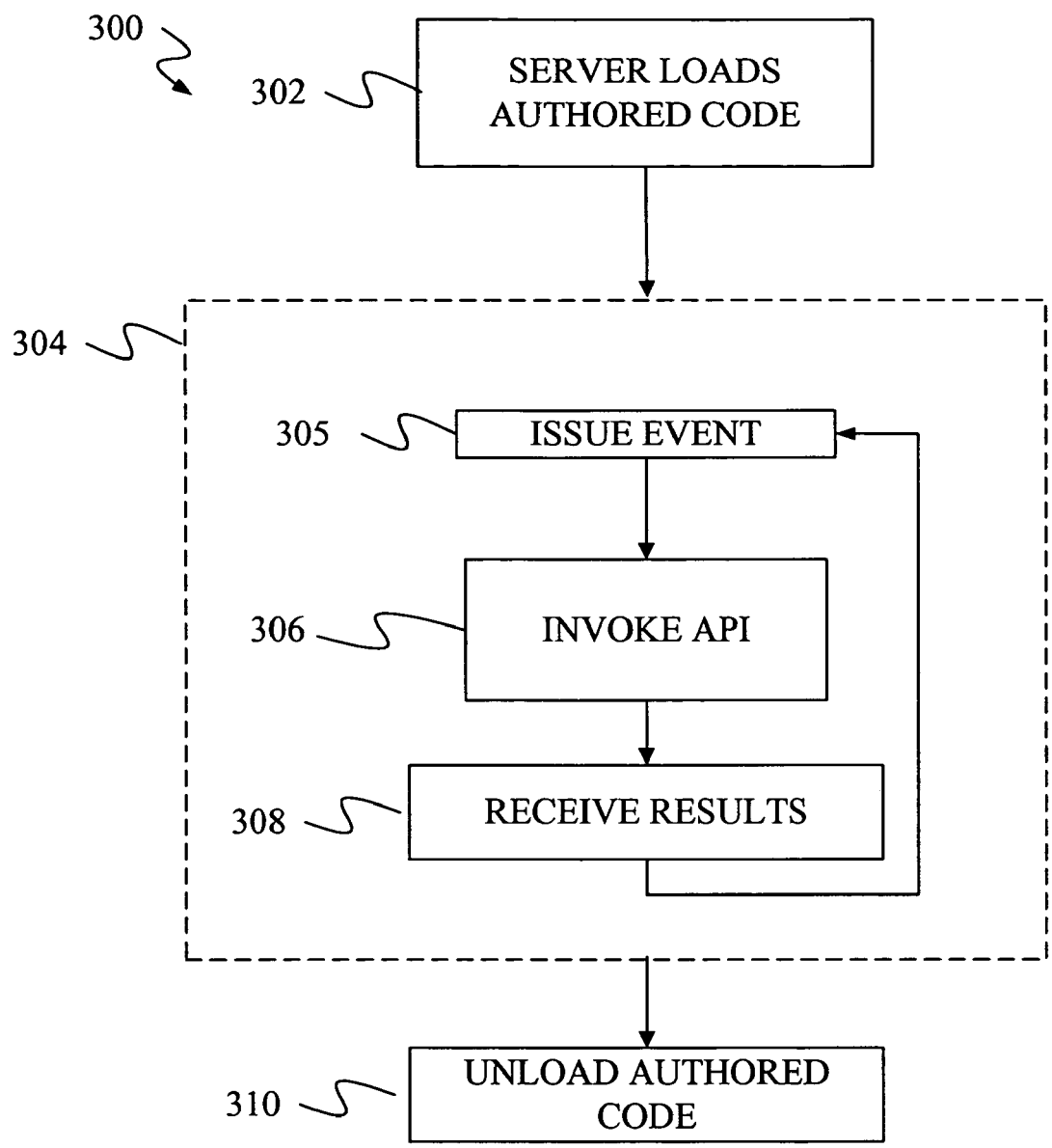
FIG. 3A is a flow chart of operation for the operating environment of FIG. 2A.

FIG. 3A illustrates a method 300 for operation of the environment of FIG. 2A. At step 302, server 214 loads the authored code 210 upon a request by a process or user interacting therewith. Step 304 generally represents operation of the application. In the exemplary embodiment, server 214 issues events that are handled by the event handler of the author code 210. In the exemplary speech application scenario, the events typically include prompt initiation, prompt completion, recognition initiation and recognition completion to name just a few. There are numerous events which can vary from application to application. Nevertheless, such events are well defined and well known, the issuing of which is represented by step 305.

At step 306, the event handler may invoke one or more APIs through calls to the server 214. Necessary parameters are defined by the authored code 210 and communicated with the API calls. The server 214 operates in accordance with the API called and with user or process interaction, by raising yet other events and/or providing results 219, at step 308, to the authored code 210. When the application is complete, the authored code 210 can be unloaded from the server 214 at step 310.

Referring now to the network or web based environment of FIG. 2B, authored code 210, which embodies the functionality of the speech application, can be the same as that used in the environment of FIG. 2A. In this manner, the same authored code 210 can be used in either environment; thus, the developer or author need only know how to develop the application by invoking the APIs. As in the environment of FIG. 2A, authored code 210 is executed by API processing server 234. API processing server 234 receives call invocations from authored code 210 and includes API processing module 236 discussed further below that generates mark-up 238 (e.g. SALT or VoiceXML) based on the API calls 212. The mark-up 238 is provided to a client device 240 that in turn interacts with a user or other process to render the speech application. Result information 242 from the client device 240, for example, recognized speech or events such as but not limited to those mentioned above, are returned to the API processing module 236 that in turn processes the information and provides it to the authored code 210 as results 219 in the same form as that of the environment of FIG. 2A.

In one exemplary form of a client device, the client device 240 can include the telephony processing module 220 for receiving the mark-up 238 that works with the speech synthesizer 216 and the speech recognizer 218 to allow the user to execute application and receive and provide information. The same reference numbers have been used in FIG. 2B for the telephony processing module, speech synthesizer and speech recognizer not to imply that they are the same as used in FIG. 2A, but rather that they perform similar functions. Details of telephony processing module, speech synthesizer and speech recognizer are not necessary for the understanding of the description herein provided. These components and modules are well-known to those skilled in the art.

It should also be noted that other forms of client devices, such as a mobile phone, handheld personal information manager or the like, that do not have sufficient computing resources for performing speech recognition, speech synthesis etc. can also be used in the environments of FIG. 2A or 2B. In the environment of FIG. 2A, these client devices can suitably interact with server 214, speech synthesizer 216 and/or speech recognizer 218 as needed using any form of communication protocol. Likewise, a client device, such as but not limited to a phone or handheld device that receives and processes mark-up 238, can be used in the environment of FIG. 2B. Furthermore, the speech synthesizer 216 and/or speech recognizer 218 can form part of server 214 or server 234, or be a located on a separate machine operatively connected to server 214, server 234 and/or client device 240 through a network or other communications link.

Figure 3B:
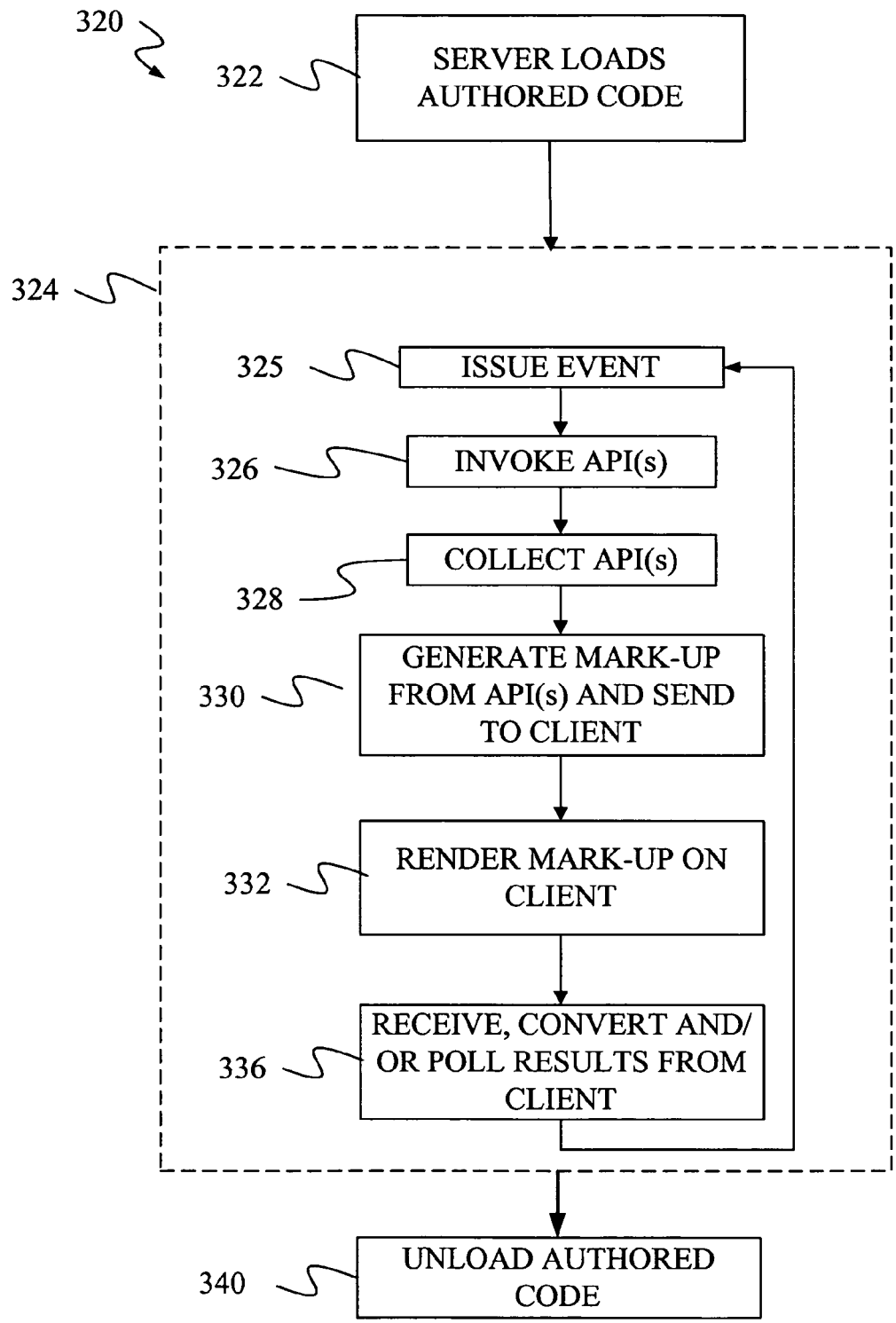
FIG. 3B is a flow chart of operation for the operating environment of FIG. 2B.

FIG. 3B illustrates a method 320 for operation of the environment of FIG. 2B. At step 322, server 234 loads the authored code 210 upon a request by a process or user interacting therewith. However, in this environment, the request is typically initiated by the remote client device 240 connected to the server 234 through a network using a protocol such as but not limited to HTTP.

Step 324 generally represents operation of the application. As in the previous environment described above, server 234 issues events, at step 325, that are handled by the event handler of the author code 210. The events typically include prompt initiation, prompt completion, recognition initiation and recognition completion to name just a few. There are numerous events which can vary from application to application. Nevertheless, such events are well defined and well known. At step 326, the event handler of the authored code 10 may invoke one or more APIs through calls to the server 234. Necessary parameters are defined by the authored code 210 and communicated with the API calls.

As mentioned above, the server 234 will generate mark-up 238 based on the API(s) invoked; however, simple mapping of the invoked API to the corresponding mark-up 238 may not be possible to implement the desired function or task of the application given the mark-up language being used. This may be best illustrated by an example and in comparison with the environment of FIG. 2A.

Suppose that the authored code 210 invokes an API to play a prompt and another API to start recognition essentially at the same time. This operation allows what is commonly known as "barge-in" where the user can speak (i.e. interrupt) while the prompt is playing. In the fully non-distributed environment of FIG. 2A, the call to play a prompt would start the speech synthesizer 216 and the call to do recognition would start the speech recognizer 218 (again, both the speech synthesizer 216 and speech recognizer 218 are objects or modules managed by the server 214). However, to implement the same task, the server 234 of the network environment of FIG. 2B, needs to wait until the authored code ends for the given event or task to know which mark-up to generate because starting a prompt on its own or starting it with recognition is different. VoiceXML for example uses a "<prompt>" tag in one case and a "<field>" tag in the other (SALT makes similar distinction). Therefore the server 234 may wait until the completion of one or several handlers, and hence, wait for and/or temporarily collect or store one or more APIs before rendering the mark-up 238 as represented by step 328.

One method for detecting when the authored code 210 has invoked all the APIs needed for a particular task is to monitor when control of a thread of the application is released. A thread is placeholder information associated with execution of the authored code, where a thread is typically required to execute instructions of the application. Stated another way, a thread is a logical division of code that allows a server to effectively work on more than once task at a time. Allocation of threads is under the control of the server, where a thread allows the server 234 to know which task is being served as the authored code gets executed based on different events. Upon completion of the task by the authored code by invoking one or more APIs, the thread for that task is released. By keeping track of which threads are associated with each task and the corresponding APIs invoked based on each thread, server 214 will know when it has all the APIs associated with the task. At that point, it can then generate the mark-up 238 and send it to the client device 240 at step 330.

It is important to understand, that in many instances the invoked API is not executed locally on server 234. Instead, the client device 240 executes or renders the mark-up code at step 332, for example, by playing the prompt and doing recognition. Once this is done, the results are sent back to the server 234. The server 234 then generates further events and/or provides results 219 as it would have in the non-distributed case, but based on the results received from the client device 40. This is represented at step 336. It should also be noted at this step that the same kind of polling or storing as performed at step 330 may be required when raising events from the client device 40 back to the authored code. In particular, some events may be delayed (or not raised at all) compared to the non-distributed mode of execution.

The server 234 unloads the authored code when the application is complete at step 340. As can be seen from the developer's point of view, the code 210 executes in the same way in both modes.

In addition to monitoring the execution of the authored code to determine all the APIs for a given task, the server 234 must monitor the current state of the authored code 210. In the network or web environment of FIG. 2B, the authored code 210 will usually be hosted on a web server so that requests can be exchanged between it and the one or more client devices 240. However web applications are usually stateless which means that the state of the application is not maintained between requests. This is a difference with non-distributed applications which maintain state. In order to make the rendering process transparent to the authored code 210, the state of the authored code must be maintained for the duration of the application's life as represented by step 324. The step of maintaining can occur in any of the steps or between any of the steps in step 324. There are various ways of doing this, including keeping the authored code in memory or serializing and de-serializing it. The authored code is then unaware of the difference between the non-distributed environment of FIG. 2A and the network based environment of FIG. 2B. Also, if the server 234 serves more than one client device 240 at a time, the server 234 needs to be aware of the state of the authored code 210 for each client device 240 in addition to sending the appropriate mark-up to each client device 240. Serving multiple client devices 240 is well known, where the necessary information of the client devices 240 can be provided at design time or runtime.

It should also be noted that although illustrated in FIGS. 2A and 2B and described above as separate environments, this was provided for purposes of understanding and one should not conclude that separate servers 214 and 234 need be used. In other words, a single server 214, 234 can be used to operate both in the non-distributed mode of FIG. 2A or in the network based mode of FIG. 2B. Typically, the mode to be used will be based on a selection by the author or the type of process/user device being used, and in particular, whether mark-up 238 needs to be generated. The selection will be done at the start of the application execution, but this could be changed at runtime.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A method of executing an application on a server-client network based operating environment, the method comprising:

issuing events to authored code of an application, the authored code being adapted to invoke APIs on a server in a non-distributed operating environment to interact with a user or process;

collecting a plurality of APIs invoked by the authored code relevant to a task to be performed, wherein collecting comprises detecting when the authored code has invoked all the APIs needed for the task for each of a plurality of client devices by monitoring an operation of the server, wherein monitoring comprises monitoring threads of the server including monitoring release of a thread of the authored code for the task, wherein the state of the authored code is maintained for the plurality of client devices communicating with the server and executing the authored code;

generating, with a processor of a computer, mark-up language based on the plurality of collected APIs to perform the task, wherein generating the mark-up language occurs after release of the thread;

sending the generated mark-up language to a client device;

receiving a client result from the client device based on rendering the mark-up language on the client device; and providing at least one of a result and an event to the authored code based on the client result from the client device, wherein the at least one of a result and an event is provided in the same form as compared to at least one of a result and event provided to the authored code from the server when the authored code is executed in the non-distributed operating environment.

2. The method of claim 1 and further comprising maintaining a state of the authored code during execution.

3. The method of claim 2 wherein maintaining includes maintaining the authored code in memory of the server.

4. The method of claim 3 wherein maintaining includes serializing and deserializing the authored code.

5. The method of claim 1 wherein detecting includes monitoring an operation of the server.

6. The method of claim 5 wherein monitoring comprises monitoring threads of the server.

7. The method of claim 1 wherein the application is a recognition application.

8. The method of claim 7 wherein the application is a speech recognition application.

9. A computer-readable storage medium having computer-executable instructions that when executed by a computer perform a method comprising:

issuing events to authored code of a speech recognition application, the authored code being adapted to invoke APIs related to speech recognition and audible prompting on a server in a non-distributed operating environment to interact with a user or process;

storing a plurality of APIs invoked by the authored code relevant to a recognition or prompting task to be performed, wherein storing includes detecting when the authored code has invoked all the APIs needed for the task for each of a plurality of client devices, wherein detecting includes monitoring an execution of threads of the server for each of the tasks for each of the plurality of client devices;

generating mark-up language based on the plurality of collected APIs to perform the task, wherein generating the mark-up language occurs when each thread is released for each of the tasks for each of the plurality of client devices;

sending the generated mark-up language to a client device;

receiving a client result from the client device based on rendering the mark-up language on the client device; and providing at least one of a result and an event to the authored code based on the client result from the client device, wherein the at least one of a result and an event is provided in the same form as compared to at least one of a result and event provided to the authored code from the server when the authored code is executed in the non-distributed operating environment.

10. The computer-readable storage medium of claim 9 and further comprising maintaining a state of authored code for the plurality of client devices communicating with the server and executing the authored code.

11. The computer-readable storage medium of claim 9 wherein generating mark-up comprises generating mark-up based on one of Speech Application Language Tags (SALT) or mark-up based on VoiceXML.

* * * * *